(12) United States Patent
Kwasnick et al.

(10) Patent No.: US 10,513,272 B2
(45) Date of Patent: Dec. 24, 2019

(54) SAFETY INFERENCE ENGINE FOR AUTONOMOUS SYSTEMS

(71) Applicant: Intel Corporation, Santa Clara, CA (US)

(72) Inventors: Robert F. Kwasnick, Palo Alto, CA (US); Huy Le, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 51 days.

(21) Appl. No.: 15/855,842

(22) Filed: Dec. 27, 2017

(65) Prior Publication Data

US 2019/0047580 A1 Feb. 14, 2019

(51) Int. Cl.
| | |
|---|---|
| *B60W 50/02* | (2012.01) |
| *G06F 11/00* | (2006.01) |
| *B60R 16/023* | (2006.01) |
| *G05D 1/00* | (2006.01) |
| *F02D 41/26* | (2006.01) |
| *G06F 7/00* | (2006.01) |
| *B60W 10/119* | (2012.01) |
| *G07C 5/00* | (2006.01) |
| *G07C 5/08* | (2006.01) |
| *B60W 50/029* | (2012.01) |

(52) U.S. Cl.
CPC .......... *B60W 50/0205* (2013.01); *G05D 1/00* (2013.01); *G05D 1/0088* (2013.01); *G07C 5/008* (2013.01); *G07C 5/0816* (2013.01); *B60W 2050/0215* (2013.01); *B60W 2050/0292* (2013.01)

(58) Field of Classification Search
CPC ..... B60W 50/02; B60W 10/119; G06F 11/00; G06F 7/00; B60R 16/023; G05D 1/00; F02D 41/26; G07C 5/00
See application file for complete search history.

(56) References Cited

U.S. PATENT DOCUMENTS

| | | | | |
|---|---|---|---|---|
| 9,520,006 | B1 * | 12/2016 | Sankovsky | ............ G07C 5/006 |
| 9,594,725 | B1 * | 3/2017 | Cook | ................ G06F 3/0482 |
| 10,086,782 | B1 * | 10/2018 | Konrardy | ............. G05D 1/0088 |
| 2013/0096794 | A1 * | 4/2013 | Febrer | .................... B60K 17/34 |
| | | | | 701/69 |
| 2014/0074345 | A1 * | 3/2014 | Gabay | .................... G07C 5/008 |
| | | | | 701/31.4 |
| 2016/0025027 | A1 * | 1/2016 | Mentele | .................. F02D 41/22 |
| | | | | 701/102 |
| 2018/0046182 | A1 * | 2/2018 | Joyce | ................ B60W 50/0225 |

* cited by examiner

*Primary Examiner* — Yuri Kan
(74) *Attorney, Agent, or Firm* — Schwegman Lundberg & Woessner, P.A.

(57) ABSTRACT

Various systems and methods for monitoring integrate circuits for failure are described herein. A system to monitor for potential component failure includes a sensor array interface to obtain a first safety level from a first sensor and a second safety level from a second sensor, the first and second sensors installed in a machine, the first and second safety levels indicating how safe the machine is to operate; and a processor to: obtain configuration parameters from a rule data store; combine the first and second safety levels using the configuration parameters to produce a composite safety level; and initiate a responsive action based on the composite safety level.

25 Claims, 4 Drawing Sheets

SAFETY INFERENCE ENGINE FOR AUTONOMOUS SYSTEMS

TECHNICAL FIELD

Embodiments described herein generally relate to integrated circuit (IC) systems, and in particular, to monitoring ICs for failure.

BACKGROUND

In the automotive context, advanced driver assistance systems (ADAS) systems are those developed to automate, adapt, or enhance vehicle systems to increase safety and provide better driving. In such systems, safety features are designed to avoid collisions and accidents by offering technologies that alert the driver to potential problems, or to avoid collisions by implementing safeguards and taking over control of the vehicle.

ADAS relies on various sensors, actuators, and other components that are able to detect objects, determine context, and react to certain driving situations. Some of the components used for ADAS may include various types of integrated circuits (IC), which may wear out over time. Failing components in an ADAS context may result in dangerous situations.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

Integrated circuits (IC) fail due to wearing out over time. When ICs are implemented in a system with autonomous, machine-controlled behavior, there is a risk of uncontrolled failure that may result in safety consequences including loss of property or life. Safety is a regulated concern for autonomous systems, such as ADAS, robotics, drones, autonomous vehicles, and the like. As such, there is a great interest in improving safety for these types of systems.

Systems and methods described here include an autonomous system of escalatory signals and actions to manage the response to system malfunction or pending failure. The decisions are based on a set of signals assessed by a safety inference subsystem with predetermined responses. The signals are of two types: one set of signals is associated with distinct failure modes and likelihood of failure; and the second set of signals is related to system performance stability and drifts of these signals under autonomous control.

In various embodiments, which will be described further below, a host machine may be equipped with various components. Components are monitored by self-check sensors or external systems, and based on component health the host machine may elevate a safety level indicator. Based on the elevated safety level indicator, the host machine may initiate a variety of autonomous responses. Additional embodiments are described below with reference to the FIGS.

Figure 1:
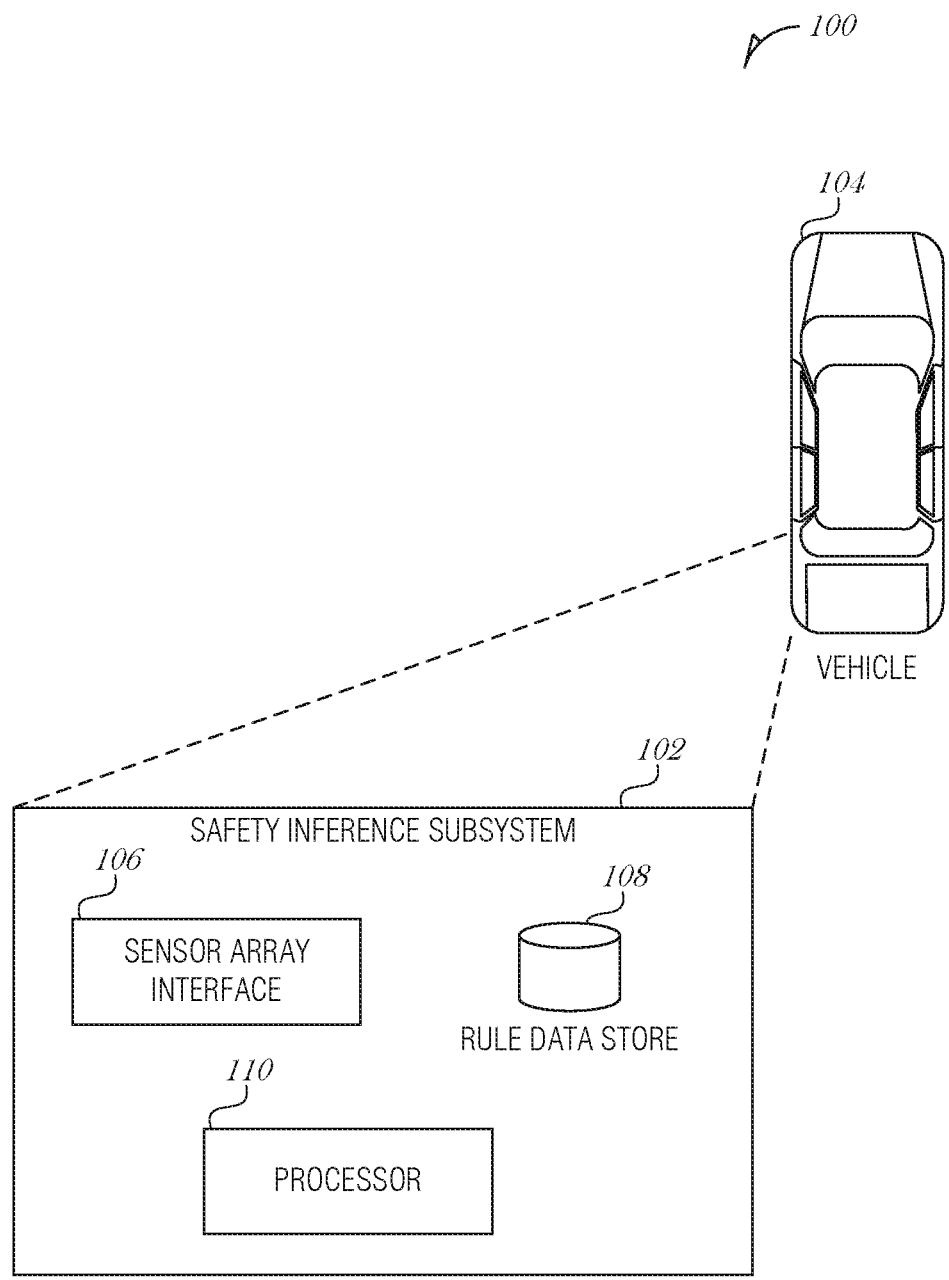
FIG. 1 is a schematic drawing illustrating a system to process sensor information to handle potential component failure, according to an embodiment.

FIG. 1 is a schematic drawing illustrating a system 100 to process sensor information to handle potential component failure, according to an embodiment. FIG. 1 includes a safety inference subsystem 102 incorporated into a machine 104. The safety inference subsystem 102 includes a sensor array interface 106, a rule data store 108, and a processor 110.

The machine 104 may be a vehicle, as depicted in FIG. 1. It is understood that the machine 104 may be any type of machine capable of autonomous action. Examples of the machine 104 include, but are not limited to an autonomous vehicle, a drone, a robot, etc. So while the discussion uses an autonomous vehicle to describe functionality of the systems and methods, these systems and methods are not limited to this context.

The machine 104 may be of any type of vehicle, such as a commercial vehicle, a consumer vehicle, a recreation vehicle, a car, a truck, a motorcycle, a boat, a drone, a robot, an airplane, a hovercraft, or any mobile craft able to operate at least partially in an autonomous mode. The machine 104 may operate at some times in a manual mode where an operator (e.g., driver) operates the machine 104 conventionally using pedals, steering wheel, and other controls. At other times, the machine 104 may operate in a fully autonomous mode, where the machine 104 operates without user intervention. In addition, the machine 104 may operate in a semi-autonomous mode, where the machine 104 controls many of the aspects of operation, but the operator may intervene or influence the operation using conventional (e.g., steering wheel) and non-conventional inputs (e.g., voice control).

The machine 104 includes a sensor array to interface with various sensors. The sensors may be used to monitor and report on the health of one or more components in the machine 104. For instance, a brake pad sensor may be used to monitor the amount of brake pad lining left on a vehicle's brakes. As another example, a battery sensor may be used to monitor the voltage level of a vehicle battery.

In some cases, the sensor is used to gather environmental information or for direct use by the host machine 104. For instance, a sensor may be a camera mounted on the front of the machine 104 and configured to detect gather imagery while the machine 104 is moving forward. This type of camera sensor may be used to detect objects in a collision avoidance system, for example. A sensor of this type may include its own self-check circuitry to monitor its own health.

Examples of these types of sensors in the autonomous vehicle context include various forward, side, and rearward facing cameras, radar, LiDAR, ultrasonic, or similar sensors.

The safety inference subsystem 102 may include, or be incorporated with, an on-board diagnostics system to record vehicle operation and other aspects of the vehicle's performance, maintenance, or status. The on-board diagnostics system may be programmed, configured, or otherwise adapted to monitor sensor health of one or more sensors in the sensor array.

The machine 104 may also include various other sensors, such as driver identification sensors (e.g., a seat sensor, an eye tracking and identification sensor, a fingerprint scanner, a voice recognition module, or the like), occupant sensors, or various environmental sensors to detect wind velocity, outdoor temperature, barometer pressure, rain/moisture, or the like.

Components of the machine 104 may communicate using a network, which may include local-area networks (LAN), wide-area networks (WAN), wireless networks (e.g., 802.11 or cellular network), the Public Switched Telephone Network (PSTN) network, ad hoc networks, personal area networks (e.g., Bluetooth), vehicle-based networks (e.g., Controller Area Network (CAN) BUS), or other combinations or permutations of network protocols and network types. The network may include a single local area network (LAN) or wide-area network (WAN), or combinations of LANs or WANs, such as the Internet. The various devices coupled to the network may be coupled to the network via one or more wired or wireless connections.

The rules stored in the rule data store 108 may be updated by local or remote programming. For instance, programming may be delivered using a wireless network technology to update rule, values, weights, logic, or the like, which may be stored in the rule data store 108. As another example, a machine-readable medium (e.g., a flash drive) may be inserted into a port in the machine 104 (e.g., a Universal Serial Bus (USB) port), to update the rules, values, weights, logic, or other data in the rule data store 108.

In operation, the safety inference subsystem 102 obtains sensor data via the sensor array interface 106 from sensors integrated in the machine 104, or sensors that are communicatively coupled to the machine 104. Based on the sensor data, the processor 110 calculates a system health value using rules from the rule data store 108. Based on the system health value, the processor 110 may cause the machine 104 to initiate or perform certain actions. The system health value may be used to indicate how safe it is to operate a system, or more particularly, how safe it is to operate a system with a component having a health or reliability as detected by the sensor.

Figure 2:
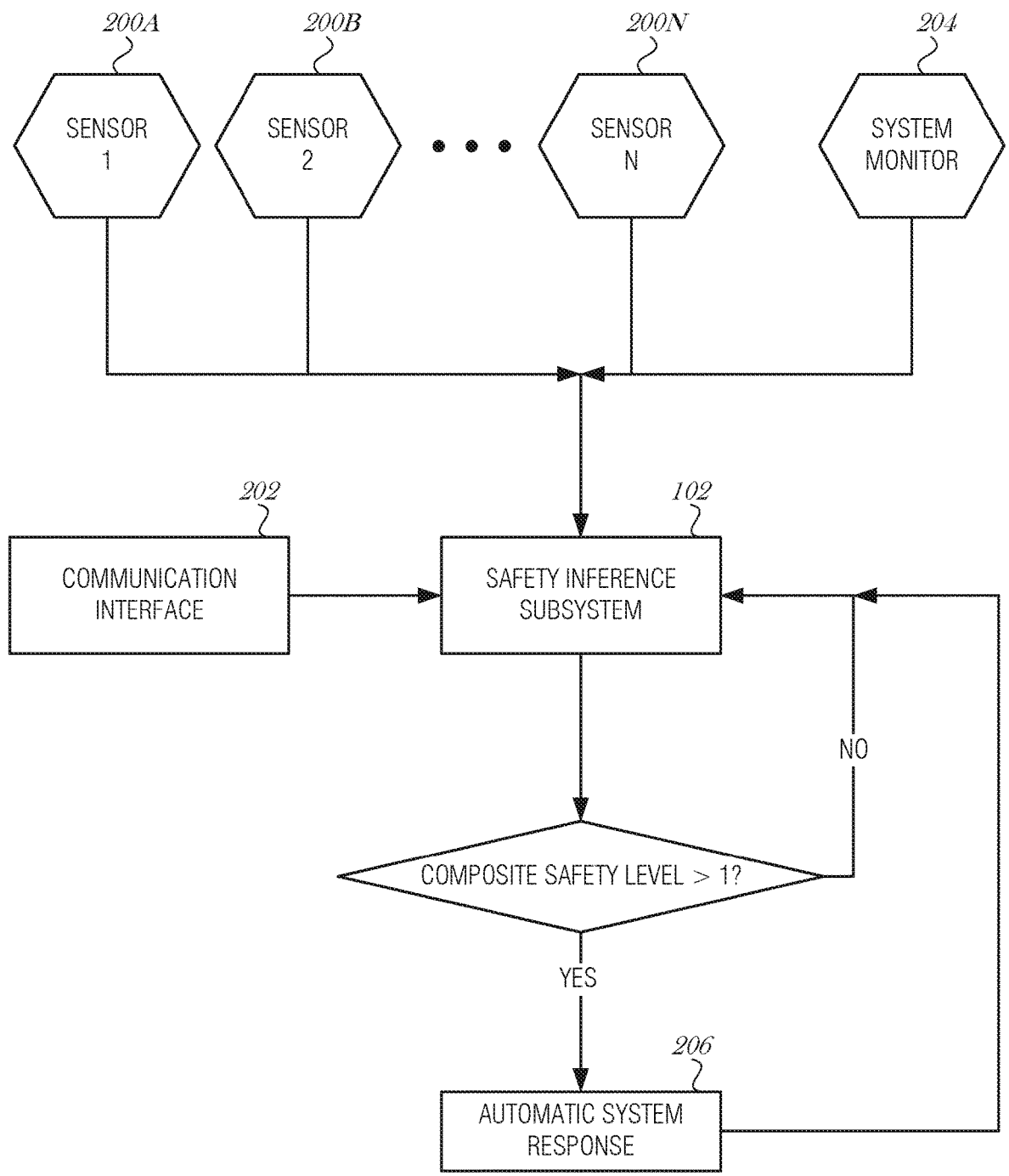
FIG. 2 is a diagram illustrating data and control flow for processing sensor information to handle potential component failure, according to an embodiment.

FIG. 2 is a diagram illustrating data and control flow for processing sensor information to handle potential component failure, according to an embodiment. A number of sensors 200A, 200B, . . . , 200N (collectively referred to as 200), provide data to a safety inference subsystem 102. The safety inference subsystem 102 may be updated using a communication interface 202. The communication interface 202 may provide remote update capabilities, for example, so that a manufacturer may update safety protocols remotely.

Each sensor 200 provides a safety level signal. The sensor 200 may be configured, programmed, or otherwise adapted to monitor a component (e.g., a brake system, a flight system, a camera, or the like). Alternatively, the sensor 200 may be used to sense aspects of the operating environment and configured, programmed, or otherwise adapted to self-report the safety level signal representing its own state of operation.

The safety level signal may be derived using various techniques. One example technique is an electro-migration (EM) monitor. An EM monitor is used to monitor one or more integrated circuits (IC) and report based on the amount of stress the IC has undergone. The EM monitor may assess the amount of wearout of an IC, and hence the likelihood of failure based on usage compared to process-specific design rules. Higher stress typically indicates a higher likelihood of IC failure. In various implementations, there may be multiple distinct EM monitors, one for each different layer of metal in an IC. The safety level signal may be a composite of the various EM monitors that are monitoring a certain IC. Another example technique is the use of a reliability odometer. A reliability odometer may be used to monitor other types of stress on an IC or a component. Other types of monitoring techniques may be used to derive the safety level signal.

In addition to safety level signals generated by sensors 200, a system-level safety signal may also be generated by a system monitor 204. The system monitor 204 may act independently from the safety inference subsystem 102, or may be incorporated with the safety inference subsystem 102. The system monitor 204 is used to monitor performance of various components and report safety levels based on measured performance of the components. The system monitor 204 may obtain data from sensors 200. For example, the system monitor 204 may obtain a travel speed of 40 miles per hour (mph) from a speedometer component. The system monitor 204 may compare the travel speed reported by the speedometer with a second travel speed reported by a global positioning system unit (GPS). If the speedometer component's reported speed is off by more than a threshold amount, the system monitor 204 may determine that the speedometer component is failing and report an error to the safety inference subsystem 102. The amount of allowable variance may be defined in the rule data store (e.g., rule data store 108 in FIG. 1), programmed or hard-coded into the system monitor 204, or determined by a heuristic algorithm (e.g., machine learning).

The sensors 200 and system monitor 204 provide safety levels signals in a range that the safety inference subsystem 102 understands. The range may be defined using levels, such as depicted in the following TABLE 1.

TABLE 1

| Level | Definition |
|---|---|
| 1 | Low Safety Impact |
| 2 | Medium Safety Impact |
| 3 | High Safety Impact |
| 4 | Very High Safety Impact |
| 5 | Critical Safety Impact |

It is understood that the levels and values used in TABLE 1 are illustrative and that any number of values may be used.

In the implementation being discussed, a Level 1 safety impact is used to indicate normal operating status, whereas a Level 5 safety impact is used to indicate complete failure of a component that may result in dire consequences.

In some implementations, multiple components are used to provide redundancy. For instance, in an autonomous vehicle there may be multiple collision avoidance systems (e.g., redundant cameras, image classifiers, processors, etc.) such that if one system were to fail, the other redundant system may be activated to ensure ongoing operation. In such a configuration, the failure of one system is enough to raise a significant safety concern. As such, under an example rule set, when a primary system fails and a redundant system is brought online, the sensor monitoring the primary/redundant system may report a Level 3 safety impact value.

The sensors 200 may monitor components or report safety levels at regular intervals. The intervals may vary based on the importance of the component being monitored. For instance, a lane guidance system may be sampled every second, whereas an air conditioning system may be sampled every five minutes.

The safety inference subsystem 102 combines the safety signals from the various sensors into a composite safety level. The composite safety level is used to guide a response. The composite safety level may be calculated using a simple maximum function of all of the safety signals, such as MAX (Sensor Value 1, Sensor Value 2, . . . , Sensor Value N). In this way, the highest safety impact level controls the safety inference subsystem 102. In other implementations, the safety inference subsystem 102 may combine the safety signals using a weighted function, a decision tree, a machine-learning algorithm, or the like. Weights, thresholds, artificial neuron values for use in an artificial neural network, or other configuration variables may be stored in the rule data store (108 in FIG. 1).

If the composite safety level is abnormal, e.g., greater than one in the current example, then the safety inference subsystem 102 initiates an automatic system response (operation 206). The automatic system response 206 may be different for each possible composite safety level. For example, TABLE 2 includes responsive actions that may be initiated by the safety inference subsystem 102 based on the composite safety level.

TABLE 2

| Composite Safety Level | Responsive Action |
| --- | --- |
| 1 | No action - system is health |
| 2 | Provide warning to service vehicle |
| 3 | Initiate safe operation mode |
| 4 | Autonomous operation to obtain service |
| 5 | Autonomous operation to disable vehicle |

For a composite safety level of 2, the safety inference subsystem 102 may cause a light to be displayed on a vehicle dashboard, for example. Other types of warnings may be initiated, such as a verbal, audible, visible, or haptic signal provided to an operator. Warnings may also be transmitted to other people or systems, such as a reporting database where a manufacturer may compile reports on vehicle operation. Warnings may be provided to a vehicle service shop, a vehicle owner, or other people or parties that may be interested in the information.

For a composite safety level of 3, the safety inference subsystem 102 may initiate one or more operations to ensure operational safety. Some abilities may be disabled or reduced. For example, in a vehicle setting, if a composite safety level of 3 is determined, then the vehicle may be disabled such that it cannot travel faster than 30 mph or cannot operate for more than an additional 20 minutes. As another example, autonomous vehicle operation may be disabled so that the operator is fully aware of the vehicle's condition.

For a composite safety level of 4, the safety inference subsystem 102 may initiate one or more operations to ensure quick and immediate service. For instance, the safety inference subsystem 102 may navigate the vehicle to the nearest service shop.

For a composite safety level of 5, the safety inference subsystem 102 may initiate one or more operations to ensure safety of the occupants of a vehicle. For instance, the safety inference subsystem 102 may cause the vehicle to pull over to the side of the road and turn off. The safety inference subsystem 102 may initiate a call for assistance to a tow truck, service vehicle, emergency response, or other service.

Thus, with safety as a key component of autonomous operation, the systems and methods described provide escalating safety responses that are commensurate with the potential unsafe operation.

Figure 3:
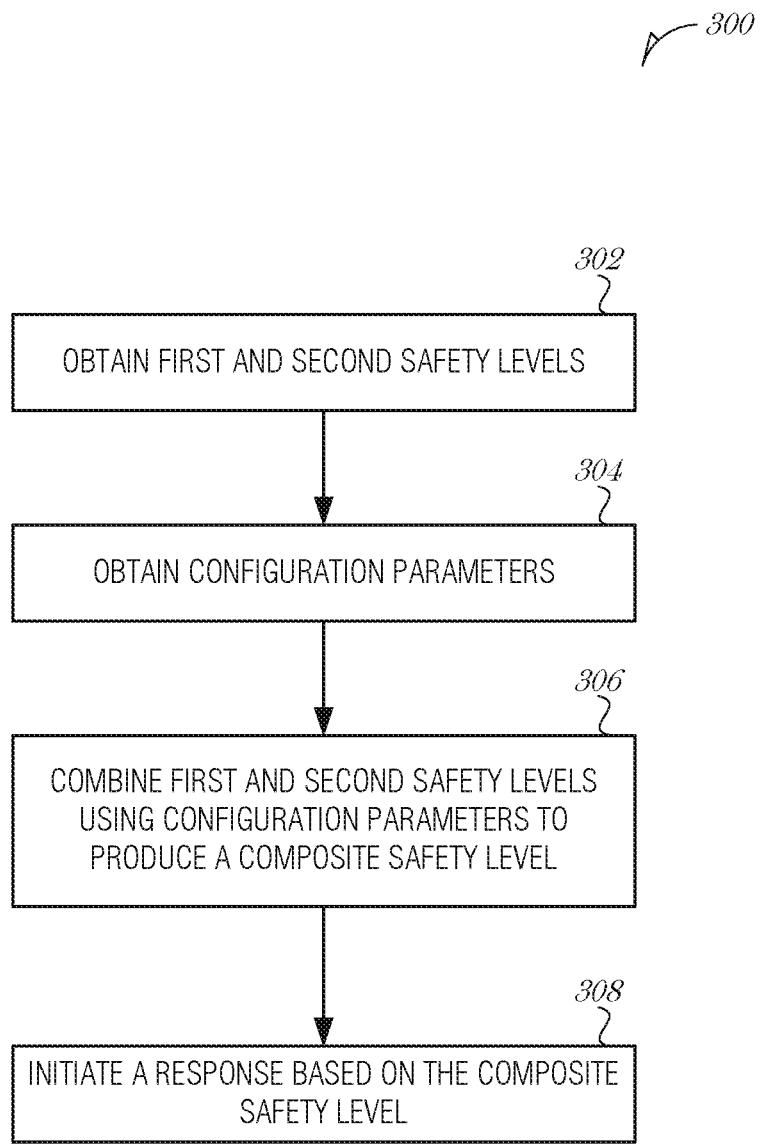
FIG. 3 is a flowchart illustrating a method for monitoring for potential component failure, according to an embodiment.

FIG. 3 is a flowchart illustrating a method 300 for monitoring for potential component failure, according to an embodiment. At 302, a first safety level is obtained from a first sensor and a second safety level is obtained from a second sensor. The first and second sensors are installed in a machine. The first and second safety levels are used to indicate how safe the machine is to operate.

In an embodiment, machine comprises an autonomous vehicle. In another embodiment, the machine comprises a drone. In another embodiment, the machine comprises a robot.

In various embodiments, the first sensor is a visible light camera, an acoustic sensor, a laser scanner, or a radar.

In an embodiment, the first sensor comprises a system monitor to monitor a component of the machine, and in such an embodiment, the first safety level is based on a deviation from normal operation of the component.

In an embodiment, the first safety level is an enumerated value within a range of values. In a further embodiment, the range of values is from 1 to 5, where lower numbers indicate safer operation and higher numbers indicate more unsafe operation of the machine.

In an embodiment, the first safety level is based on a measure of stress or wear of an integrated circuit that the first sensor is monitoring. In a related embodiment, the first safety level is based on a calculation drift of an integrated circuit that the first sensor is monitoring. In a related embodiment, the first safety level is based on an error rate of an integrated circuit that the first sensor is monitoring.

At 304, configuration parameters are obtained from a rule data store. In an embodiment, the configuration parameters include a first weight and a second weight, the first and second weights for use in a weighted formula with the respective first and second safety levels.

In an embodiment, the configuration parameters include a set of thresholds to use in a decision tree.

In an embodiment, the configuration parameters include a set of weights to use as artificial neuron values in a machine-learning technique.

At 306, the first and second safety levels are combined using the configuration parameters to produce a composite safety level. In an embodiment, combining the first and second safety levels includes using a maximum function to set the composite safety level equal to the highest safety level of the first and second safety levels.

In an embodiment, combining the first and second safety levels includes using a weighted function to set the composite safety level, each of the first and second safety levels weighted by a respective first and second weight.

At 308, a responsive action is initiated based on the composite safety level. In an embodiment, initiating the response action comprises includes determining that the composite safety level indicates a warning level and initiating the presentation of a warning to an operator of the machine.

In an embodiment, initiating the response action includes determining that the composite safety level indicates a high safety impact level and initiating a safe operation mode of the machine.

In an embodiment, initiating the response action includes determining that the composite safety level indicates a critical safety impact level and initiating an autonomous operation mode of the machine. In a further embodiment, initiating the autonomous operation mode includes designating a destination of the machine and causing the machine to autonomously navigate to the destination for service. In a further embodiment, the destination comprises a service station. In a related embodiment, the destination comprises a shoulder of a road. Here, the machine may be caused to autonomously navigate to the destination by pulling over to the shoulder and causing the machine to initiate a call for assistance.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hard-wired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

"Circuitry," as used in any embodiment herein, may comprise, for example, singly or in any combination, hard-wired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture.

Figure 4:
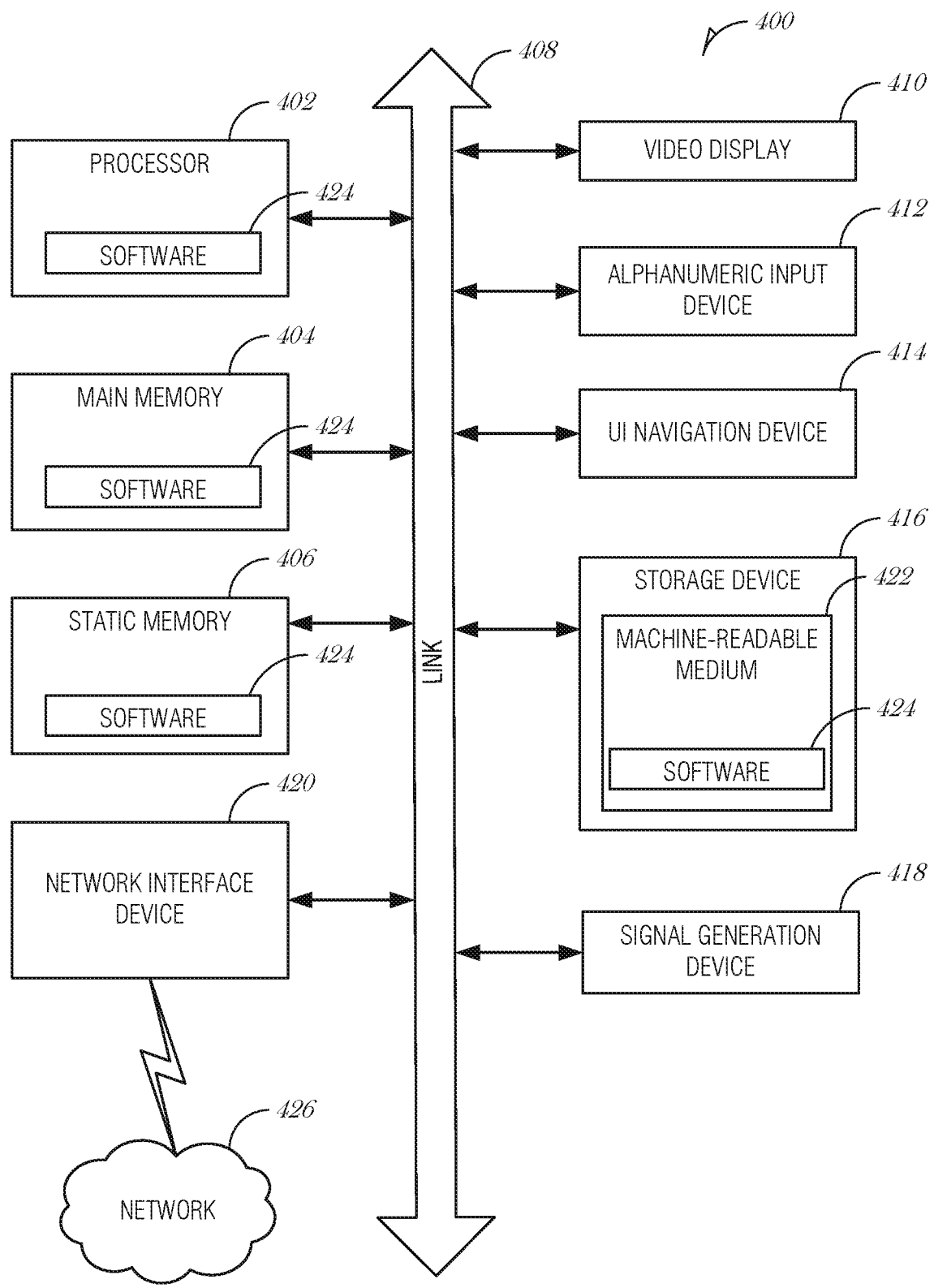
FIG. 4 is a block diagram illustrating an example machine upon which any one or more of the techniques (e.g., methodologies) discussed herein may perform, according to an embodiment.

FIG. 4 is a block diagram illustrating a machine in the example form of a computer system 400, within which a set or sequence of instructions may be executed to cause the machine to perform any one of the methodologies discussed herein, according to an embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a head-mounted display, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 400 includes at least one processor 402 (e.g., a central processing unit (CPU), a graphics processing unit (GPU) or both, processor cores, compute nodes, etc.), a main memory 404 and a static memory 406, which communicate with each other via a link 408 (e.g., bus). The computer system 400 may further include a video display unit 410, an alphanumeric input device 412 (e.g., a keyboard), and a user interface (UI) navigation device 414 (e.g., a mouse). In one embodiment, the video display unit 410, input device 412 and UI navigation device 414 are incorporated into a touch screen display. The computer system 400 may additionally include a storage device 416 (e.g., a drive unit), a signal generation device 418 (e.g., a speaker), a network interface device 420, and one or more sensors (not shown), such as a global positioning system (GPS) sensor, compass, accelerometer, gyrometer, magnetometer, or other sensor.

The storage device 416 includes a machine-readable medium 422 on which is stored one or more sets of data structures and instructions 424 (e.g., software) embodying or utilized by any one or more of the methodologies or functions described herein. The instructions 424 may also reside, completely or at least partially, within the main memory 404, static memory 406, and/or within the processor 402 during execution thereof by the computer system 400, with the main memory 404, static memory 406, and the processor 402 also constituting machine-readable media.

While the machine-readable medium 422 is illustrated in an example embodiment to be a single medium, the term "machine-readable medium" may include a single medium or multiple media (e.g., a centralized or distributed database, and/or associated caches and servers) that store the one or more instructions 424. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, 3G, and 4G LTE/LTE-A, 5G, DSRC, or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples:

Example 1 is a system to monitor for potential component failure, the system comprising: a sensor array interface to obtain a first safety level from a first sensor and a second safety level from a second sensor, the first and second sensors installed in a machine, the first and second safety levels indicating how safe the machine is to operate; and a processor to: obtain configuration parameters from a rule data store; combine the first and second safety levels using the configuration parameters to produce a composite safety level; and initiate a responsive action based on the composite safety level.

In Example 2, the subject matter of Example 1 includes, wherein the machine comprises an autonomous vehicle.

In Example 3, the subject matter of Examples 1-2 includes, wherein the machine comprises a drone.

In Example 4, the subject matter of Examples 1-3 includes, wherein the machine comprises a robot.

In Example 5, the subject matter of Examples 1-4 includes, wherein the first sensor is a visible light camera, an acoustic sensor, a laser scanner, or a radar.

In Example 6, the subject matter of Examples 1-5 includes, wherein the first sensor comprises a system monitor to monitor a component of the machine, and wherein the first safety level is based on a deviation from normal operation of the component.

In Example 7, the subject matter of Examples 1-6 includes, wherein the first safety level is an enumerated value within a range of values.

In Example 8, the subject matter of Example 7 includes, where lower numbers indicate safer operation and higher numbers indicate more unsafe operation of the machine.

In Example 9, the subject matter of Examples 1-8 includes, wherein the first safety level is based on a measure of stress or wear of an integrated circuit that the first sensor is monitoring.

In Example 10, the subject matter of Examples 1-9 includes, wherein the first safety level is based on a calculation drift of an integrated circuit that the first sensor is monitoring.

In Example 11, the subject matter of Examples 1-10 includes, wherein the first safety level is based on an error rate of an integrated circuit that the first sensor is monitoring.

In Example 12, the subject matter of Examples 1-11 includes, wherein the configuration parameters include a first weight and a second weight, the first and second weights for use in a weighted formula with the respective first and second safety levels.

In Example 13, the subject matter of Examples 1-12 includes, wherein the configuration parameters include a set of thresholds to use in a decision tree.

In Example 14, the subject matter of Examples 1-13 includes, wherein the configuration parameters include a set of weights to use as artificial neuron values in a machine-learning technique.

In Example 15, the subject matter of Examples 1-14 includes, wherein to combine the first and second safety levels, the processor is to: use a maximum function to set the composite safety level equal to the highest safety level of the first and second safety levels.

In Example 16, the subject matter of Examples 1-15 includes, wherein to combine the first and second safety levels, the processor is to: use a weighted function to set the composite safety level, each of the first and second safety levels weighted by a respective first and second weight.

In Example 17, the subject matter of Examples 1-16 includes, wherein to initiate the response action, the processor is to: determine that the composite safety level indicates a warning level; and initiate the presentation of a warning to an operator of the machine.

In Example 18, the subject matter of Examples 1-17 includes, wherein to initiate the response action, the processor is to: determine that the composite safety level indicates a high safety impact level; and initiate a safe operation mode of the machine.

In Example 19, the subject matter of Examples 1-18 includes, wherein to initiate the response action, the processor is to: determine that the composite safety level indicates a critical safety impact level; and initiate an autonomous operation mode of the machine.

In Example 20, the subject matter of Example 19 includes, wherein to initiate the autonomous operation mode, the processor is to: designate a destination of the machine; and cause the machine to autonomously navigate to the destination for service.

In Example 21, the subject matter of Example 20 includes, wherein the destination comprises a service station.

In Example 22, the subject matter of Examples 20-21 includes, wherein the destination comprises a shoulder of a road, and wherein to cause the machine to autonomously navigate to the destination, the processor is to: cause the machine to pull over to the shoulder; and cause the machine to initiate a call for assistance.

Example 23 is a method for monitoring for potential component failure, the method comprising: obtaining a first safety level from a first sensor and a second safety level from a second sensor, the first and second sensors installed in a machine, the first and second safety levels indicating how safe the machine is to operate; obtaining configuration parameters from a rule data store; combining the first and second safety levels using the configuration parameters to produce a composite safety level; and initiating a responsive action based on the composite safety level.

In Example 24, the subject matter of Example 23 includes, wherein the machine comprises an autonomous vehicle.

In Example 25, the subject matter of Examples 23-24 includes, wherein the machine comprises a drone.

In Example, 26, the subject matter of Examples 23-25 includes, wherein the machine comprises a robot.

In Example 27, the subject matter of Examples 23-26 includes, wherein the first sensor is a visible light camera, an acoustic sensor, a laser scanner, or a radar.

In Example 28, the subject matter of Examples 23-27 includes, wherein the first sensor comprises a system monitor to monitor a component of the machine, and wherein the first safety level is based on a deviation from normal operation of the component.

In Example 29, the subject matter of Examples 23-28 includes, wherein the first safety level is an enumerated value within a range of values.

In Example 30, the subject matter of Example 29 includes, where lower numbers indicate safer operation and higher numbers indicate more unsafe operation of the machine.

In Example 31, the subject matter of Examples 23-30 includes, wherein the first safety level is based on a measure of stress or wear of an integrated circuit that the first sensor is monitoring.

In Example 32, the subject matter of Examples 23-31 includes, wherein the first safety level is based on a calculation drift of an integrated circuit that the first sensor is monitoring.

In Example 33, the subject matter of Examples 23-32 includes, wherein the first safety level is based on an error rate of an integrated circuit that the first sensor is monitoring.

In Example 34, the subject matter of Examples 23-33 includes, wherein the configuration parameters include a first weight and a second weight, the first and second weights for use in a weighted formula with the respective first and second safety levels.

In Example 35, the subject matter of Examples 23-34 includes, wherein the configuration parameters include a set of thresholds to use in a decision tree.

In Example 36, the subject matter of Examples 23-35 includes, wherein the configuration parameters include a set of weights to use as artificial neuron values in a machine-learning technique.

In Example 37, the subject matter of Examples 23-36 includes, wherein combining the first and second safety levels comprises: using a maximum function to set the composite safety level equal to the highest safety level of the first and second safety levels.

In Example 38, the subject matter of Examples 23-37 includes, wherein combining the first and second safety levels comprises: using a weighted function to set the composite safety level, each of the first and second safety levels weighted by a respective first and second weight.

In Example 39, the subject matter of Examples 23-38 includes, wherein initiating the response action comprises: determining that the composite safety level indicates a warning level; and initiating the presentation of a warning to an operator of the machine.

In Example 40, the subject matter of Examples 23-39 includes, wherein initiating the response action comprises: determining that the composite safety level indicates a high safety impact level; and initiating a safe operation mode of the machine.

In Example 41, the subject matter of Examples 23-40 includes, wherein initiating the response action comprises: determining that the composite safety level indicates a critical safety impact level; and initiating an autonomous operation mode of the machine.

In Example 42, the subject matter of Example 41 includes, wherein initiating the autonomous operation mode comprises: designating a destination of the machine; and causing the machine to autonomously navigate to the destination for service.

In Example 43, the subject matter of Example 42 includes, wherein the destination comprises a service station.

In Example 44, the subject matter of Examples 42-43 includes, wherein the destination comprises a shoulder of a road, and wherein causing the machine to autonomously navigate to the destination comprises: causing the machine to pull over to the shoulder; and causing the machine to initiate a call for assistance.

Example 45 is at least one machine-readable medium including instructions, which when executed by a machine, cause the machine to perform operations of any of the methods of Examples 23-44.

Example 46 is an apparatus comprising means for performing any of the methods of Examples 23-44.

Example 47 is an apparatus for monitoring for potential component failure, the apparatus comprising: means for obtaining a first safety level from a first sensor and a second safety level from a second sensor, the first and second sensors installed in a machine, the first and second safety levels indicating how safe the machine is to operate; means for obtaining configuration parameters from a rule data store; means for combining the first and second safety levels using the configuration parameters to produce a composite safety level; and means for initiating a responsive action based on the composite safety level.

In Example 48, the subject matter of Example 47 includes, wherein the machine comprises an autonomous vehicle.

In Example 49, the subject matter of Examples 47-48 includes, wherein the machine comprises a drone.

In Example 50, the subject matter of Examples 47-49 includes, wherein the machine comprises a robot.

In Example 51, the subject matter of Examples 47-50 includes, wherein the first sensor is a visible light camera, an acoustic sensor, a laser scanner, or a radar.

In Example 52, the subject matter of Examples 47-51 includes, wherein the first sensor comprises a system monitor to monitor a component of the machine, and wherein the first safety level is based on a deviation from normal operation of the component.

In Example 53, the subject matter of Examples 47-52 includes, wherein the first safety level is an enumerated value within a range of values.

In Example 54, the subject matter of Example 53 includes, where lower numbers indicate safer operation and higher numbers indicate more unsafe operation of the machine.

In Example 55, the subject matter of Examples 47-54 includes, wherein the first safety level is based on a measure of stress or wear of an integrated circuit that the first sensor is monitoring.

In Example 56, the subject matter of Examples 47-55 includes, wherein the first safety level is based on a calculation drift of an integrated circuit that the first sensor is monitoring.

In Example 57, the subject matter of Examples 47-56 includes, wherein the first safety level is based on an error rate of an integrated circuit that the first sensor is monitoring.

In Example 58, the subject matter of Examples 47-57 includes, wherein the configuration parameters include a first weight and a second weight, the first and second weights for use in a weighted formula with the respective first and second safety levels.

In Example 59, the subject matter of Examples 47-58 includes, wherein the configuration parameters include a set of thresholds to use in a decision tree.

In Example 60, the subject matter of Examples 47-59 includes, wherein the configuration parameters include a set of weights to use as artificial neuron values in a machine-learning technique.

In Example 61, the subject matter of Examples 47-60 includes, wherein the means for combining the first and second safety levels comprise: means for using a maximum function to set the composite safety level equal to the highest safety level of the first and second safety levels.

In Example 62, the subject matter of Examples 47-61 includes, wherein the means for combining the first and second safety levels comprise: means for using a weighted function to set the composite safety level, each of the first and second safety levels weighted by a respective first and second weight.

In Example 63, the subject matter of Examples 47-62 includes, wherein the means for initiating the response action comprise: means for determining that the composite safety level indicates a warning level; and means for initiating the presentation of a warning to an operator of the machine.

In Example 64, the subject matter of Examples 47-63 includes, wherein the means for initiating the response action comprise: means for determining that the composite safety level indicates a high safety impact level; and means for initiating a safe operation mode of the machine.

In Example 65, the subject matter of Examples 47-64 includes, wherein the means for initiating the response action comprise: means for determining that the composite safety level indicates a critical safety impact level; and means for initiating an autonomous operation mode of the machine.

In Example 66, the subject matter of Example 65 includes, wherein the means for initiating the autonomous operation mode comprise: means for designating a destination of the machine; and means for causing the machine to autonomously navigate to the destination for service.

In Example, 67, the subject matter of Example 66 includes, wherein the destination comprises a service station.

In Example 68, the subject matter of Examples 66-67 includes, wherein the destination comprises a shoulder of a road, and wherein the means for causing the machine to autonomously navigate to the destination comprise: means for causing the machine to pull over to the shoulder; and means for causing the machine to initiate a call for assistance.

Example 69 is at least one machine-readable medium including instructions for monitoring for potential component failure, the instructions when executed by a machine, cause the machine to perform operations comprising: obtaining a first safety level from a first sensor and a second safety level from a second sensor, the first and second sensors installed in a machine, the first and second safety levels indicating how safe the machine is to operate; obtaining configuration parameters from a rule data store; combining the first and second safety levels using the configuration parameters to produce a composite safety level; and initiating a responsive action based on the composite safety level.

In Example 70, the subject matter of Example 69 includes, wherein the machine comprises an autonomous vehicle.

In Example 71, the subject matter of Examples 69-70 includes, wherein the machine comprises a drone.

In Example 72, the subject matter of Examples 69-71 includes, wherein the machine comprises a robot.

In Example 73, the subject matter of Examples 69-72 includes, wherein the first sensor is a visible light camera, an acoustic sensor, a laser scanner, or a radar.

In Example 74, the subject matter of Examples 69-73 includes, wherein the first sensor comprises a system monitor to monitor a component of the machine, and wherein the first safety level is based on a deviation from normal operation of the component.

In Example 75, the subject matter of Examples 69-74 includes, wherein the first safety level is an enumerated value within a range of values.

In Example 76, the subject matter of Example 75 includes, where lower numbers indicate safer operation and higher numbers indicate more unsafe operation of the machine.

In Example 77, the subject matter of Examples 69-76 includes, wherein the first safety level is based on a measure of stress or wear of an integrated circuit that the first sensor is monitoring.

In Example 78, the subject matter of Examples 69-77 includes, wherein the first safety level is based on a calculation drift of an integrated circuit that the first sensor is monitoring.

In Example 79, the subject matter of Examples 69-78 includes, wherein the first safety level is based on an error rate of an integrated circuit that the first sensor is monitoring.

In Example 80, the subject matter of Examples 69-79 includes, wherein the configuration parameters include a first weight and a second weight, the first and second weights for use in a weighted formula with the respective first and second safety levels.

In Example 81, the subject matter of Examples 69-80 includes, wherein the configuration parameters include a set of thresholds to use in a decision tree.

In Example 82, the subject matter of Examples 69-81 includes, wherein the configuration parameters include a set of weights to use as artificial neuron values in a machine-learning technique.

In Example 83, the subject matter of Examples 69-82 includes, wherein combining the first and second safety levels comprises: using a maximum function to set the composite safety level equal to the highest safety level of the first and second safety levels.

In Example 84, the subject matter of Examples 69-83 includes, wherein combining the first and second safety levels comprises: using a weighted function to set the composite safety level, each of the first and second safety levels weighted by a respective first and second weight.

In Example 85, the subject matter of Examples 69-84 includes, wherein initiating the response action comprises: determining that the composite safety level indicates a warning level; and initiating the presentation of a warning to an operator of the machine.

In Example 86, the subject matter of Examples 69-85 includes, wherein initiating the response action comprises: determining that the composite safety level indicates a high safety impact level; and initiating a safe operation mode of the machine.

In Example 87, the subject matter of Examples 69-86 includes, wherein initiating the response action comprises: determining that the composite safety level indicates a critical safety impact level; and initiating an autonomous operation mode of the machine.

In Example 88, the subject matter of Example 87 includes, wherein initiating the autonomous operation mode comprises: designating a destination of the machine; and causing the machine to autonomously navigate to the destination for service.

In Example 89, the subject matter of Example 88 includes, wherein the destination comprises a service station.

In Example 90, the subject matter of Examples 88-89 includes, wherein the destination comprises a shoulder of a road, and wherein causing the machine to autonomously navigate to the destination comprises: causing the machine to pull over to the shoulder; and causing the machine to initiate a call for assistance.

Example 91 is at least one machine-readable medium including instructions that, when executed by a processor subsystem, cause the processor subsystem to perform operations to implement of any of Examples 1-90.

Example 92 is an apparatus comprising means to implement of any of Examples 1-90.

Example 93 is a system to implement of any of Examples 1-90.

Example 94 is a method to implement of any of Examples 1-90.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system to monitor for potential component failure, the system comprising:
   a sensor array interface to obtain a first safety level from a first sensor and a second safety level from a second sensor, the first and second sensors installed in a machine; and
   a processor to:
      obtain configuration parameters from a rule data store;
      combine the first and second safety levels using the configuration parameters to produce a composite safety level; and
      initiate a responsive action based on the composite safety level.

2. The system of claim 1, wherein the machine comprises an autonomous vehicle.

3. The system of claim 1, wherein the first sensor is a visible light camera, an acoustic sensor, a laser scanner, or a radar.

4. The system of claim 1, wherein the first sensor comprises a system monitor to monitor a component of the machine, and wherein the first safety level is based on a deviation from normal operation of the component.

5. The system of claim 1, wherein the first safety level is an enumerated value within a range of values.

6. The system of claim 3, wherein the range of values is from 1 to 5, where lower numbers indicate safer operation and higher numbers indicate more unsafe operation of the machine.

7. The system of claim 1, wherein the first safety level is based on a measure of stress or wear of an integrated circuit that the first sensor is monitoring.

8. The system of claim 1, wherein the first safety level is based on a calculation drift of an integrated circuit that the first sensor is monitoring.

9. The system of claim 1, wherein the first safety level is based on an error rate of an integrated circuit that the first sensor is monitoring.

10. The system of claim 1, wherein the configuration parameters include a first weight and a second weight, the first and second weights for use in a weighted formula with the respective first and second safety levels.

11. The system of claim 1, wherein the configuration parameters include a set of thresholds to use in a decision tree.

12. The system of claim 1, wherein the configuration parameters include a set of weights to use as artificial neuron values in a machine-learning technique.

13. The system of claim 1, wherein to combine the first and second safety levels, the processor is to:
   use a maximum function to set the composite safety level equal to a highest safety level of the first and second safety levels.

14. The system of claim 1, wherein to combine the first and second safety levels, the processor is to:
   use a weighted function to set the composite safety level, each of the first and second safety levels weighted by a respective first and second weight.

15. The system of claim 1, wherein to initiate the response action, the processor is to:
   determine that the composite safety level indicates a warning level; and
   initiate a presentation of a warning to an operator of the machine.

16. The system of claim 1, wherein to initiate the response action, the processor is to:
   determine that the composite safety level indicates a high safety impact level; and
   initiate a safe operation mode of the machine.

17. The system of claim 1, wherein to initiate the response action, the processor is to:
   determine that the composite safety level indicates a critical safety impact level; and
   initiate an autonomous operation mode of the machine.

18. The system of claim 17, wherein to initiate the autonomous operation mode, the processor is to:
   designate a destination of the machine; and
   cause the machine to autonomously navigate to the destination for service.

19. The system of claim 18, wherein the destination comprises a service station.

20. The system of claim 18, wherein the destination comprises a shoulder of a road, and wherein to cause the machine to autonomously navigate to the destination, the processor is to:
   cause the machine to pull over to the shoulder; and
   cause the machine to initiate a call for assistance.

21. A method for monitoring for potential component failure, the method comprising:
   obtaining a first safety level from a first sensor and a second safety level from a second sensor, the first and second sensors installed in a machine;
   obtaining configuration parameters from a rule data store;
   combining the first and second safety levels using the configuration parameters to produce a composite safety level; and
   initiating a responsive action based on the composite safety level.

22. The method of claim 21, wherein initiating the response action comprises:
   determining that the composite safety level indicates a high safety impact level; and
   initiating a safe operation mode of the machine.

23. The method of claim 21, wherein initiating the response action comprises:
   determining that the composite safety level indicates a critical safety impact level; and
   initiating an autonomous operation mode of the machine.

24. At least one non-transitory machine-readable medium including instructions for monitoring for potential component failure, the instructions when executed by a machine, cause the machine to perform operations comprising:
   obtaining a first safety level from a first sensor and a second safety level from a second sensor, the first and second sensors installed in a machine;
   obtaining configuration parameters from a rule data store;
   combining the first and second safety levels using the configuration parameters to produce a composite safety level; and
   initiating a responsive action based on the composite safety level.

25. The non-transitory machine-readable medium of claim 24, wherein the configuration parameters include a set of thresholds to use in a decision tree.

* * * * *